I. E. PALMER.
COMBINED BACK REST AND WIND SHIELD FOR COUCH HAMMOCKS.
APPLICATION FILED MAR. 10, 1914.
1,103,908.
Patented July 14, 1914.
2 SHEETS—SHEET 1.
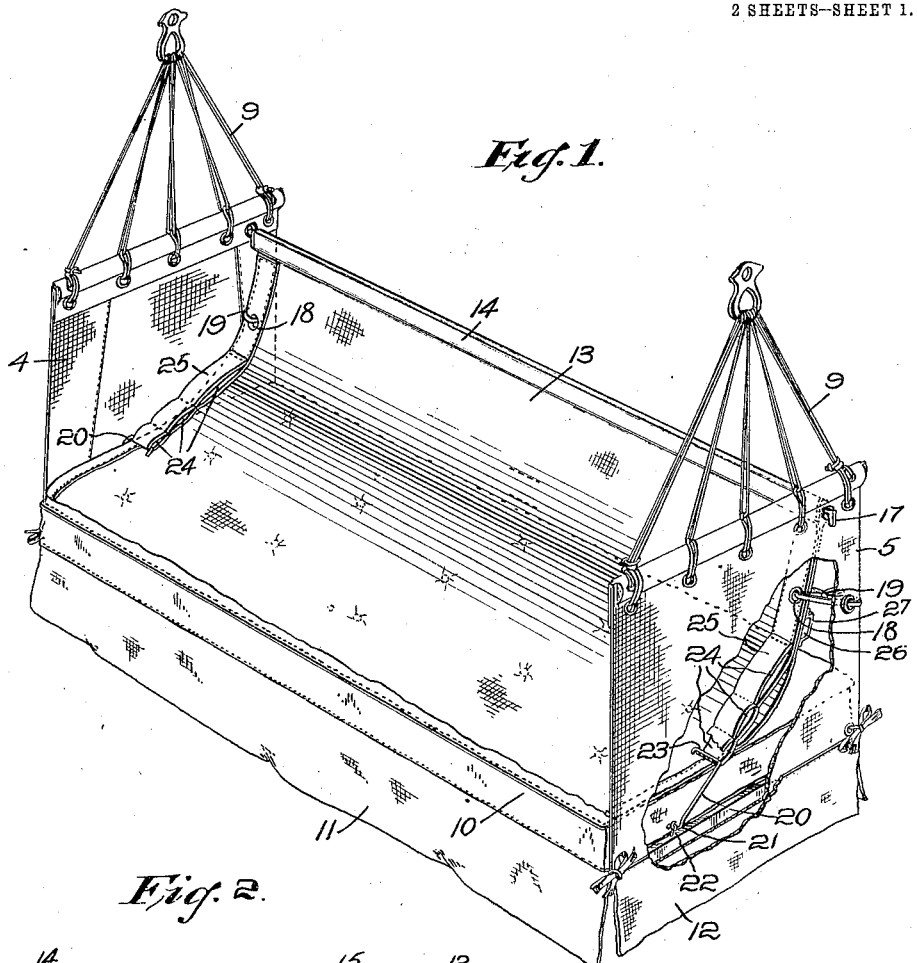
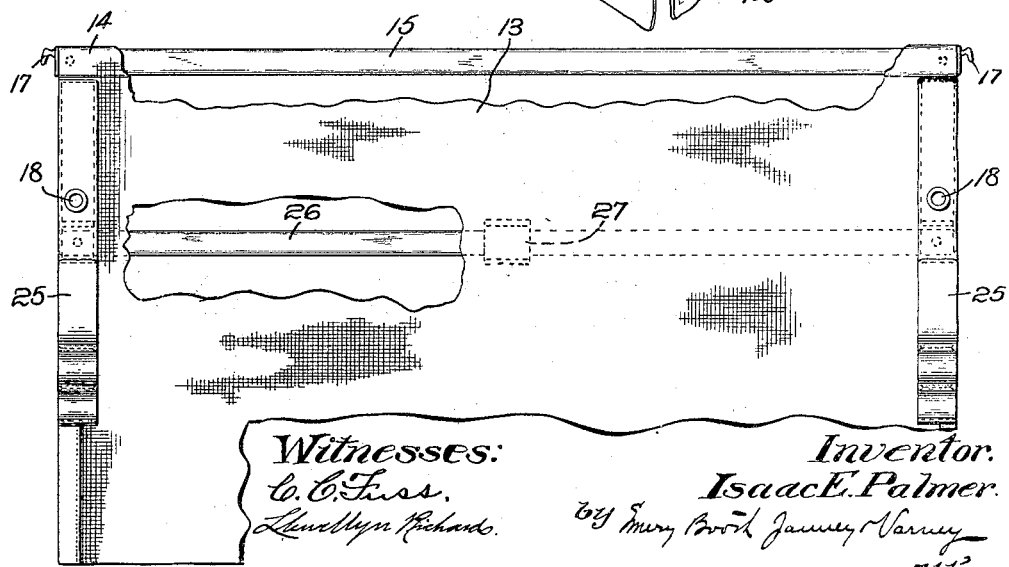

I. E. PALMER.
COMBINED BACK REST AND WIND SHIELD FOR COUCH HAMMOCKS.
APPLICATION FILED MAR. 10, 1914.
1,103,908.
Patented July 14, 1914.
2 SHEETS—SHEET 2.
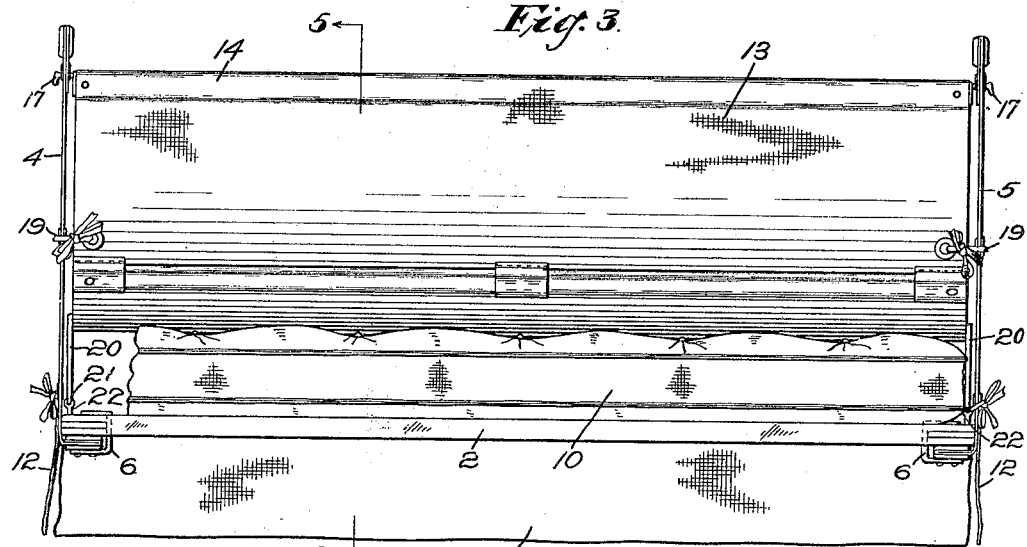
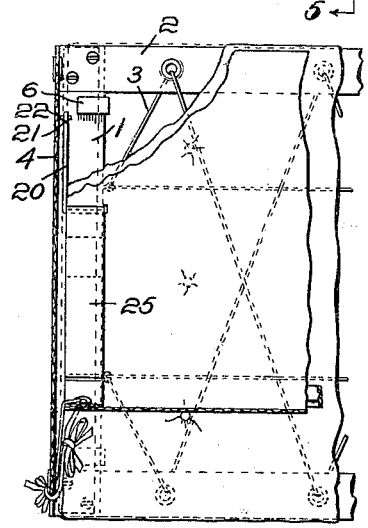
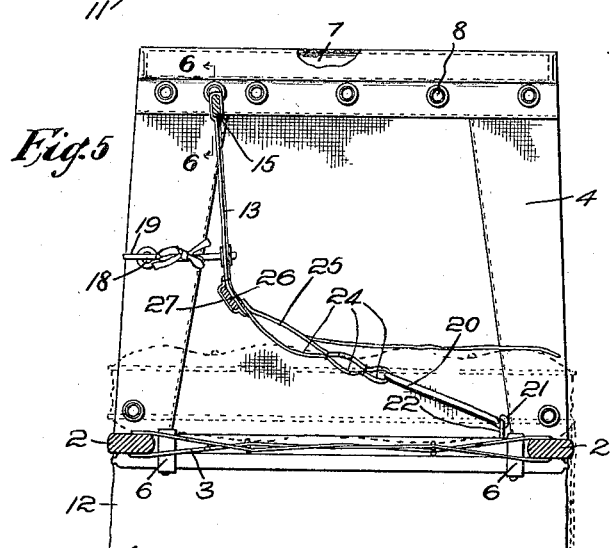
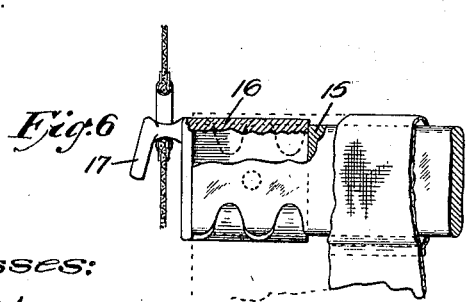
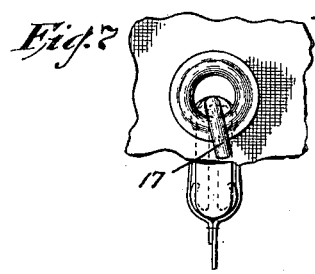
Witnesses:
Inventor.
Isaac E. Palmer.
by Emery Booth Janney & Varney
Att'ys.

UNITED STATES PATENT OFFICE.

ISAAC E. PALMER, OF MIDDLETOWN, CONNECTICUT, ASSIGNOR TO THE I. E. PALMER COMPANY, OF MIDDLETOWN, CONNECTICUT, A CORPORATION OF CONNECTICUT.

COMBINED BACK-REST AND WIND-SHIELD FOR COUCH-HAMMOCKS.

1,103,908.

Specification of Letters Patent.  Patented July 14, 1914.

Application filed March 10, 1914. Serial No. 823,818.

*To all whom it may concern:*

Be it known that I, ISAAC E. PALMER, a citizen of the United States, and a resident of Middletown, in the county of Middlesex and State of Connecticut, have invented an Improvement in Combined Back-Rests and Wind - Shields for Couch - Hammocks, of which the following description, in connection with the accompanying drawings, is a specification, like characters on the drawings representing like parts.

This invention relates to back rests or wind shields for couch hammocks and particularly to combined back rests and wind shields therefor.

An important object of the invention is to provide a back rest or wind shield which may be directly and pivotally connected to sheet-like suspension ends and may be supported either in a vertical position to serve as a wind shield or at varying angular positions to serve as a back rest.

Referring more particularly to the drawings,—Figure 1 is a perspective view of a couch hammock having my invention applied thereto; Fig. 2 is an elevation, partly broken away, of a back rest or wind shield embodying my invention; Fig. 3 is a front elevation, parts being broken away, of the structure shown in Fig. 1; Fig. 4 is a plan view showing one end of the couch hammock having my invention applied thereto; Fig. 5 is a vertical transverse section upon the line 5—5 of Fig. 3; Fig. 6 is a detail showing the preferred manner of pivotally supporting a back rest or wind shield; partly in section on the line 6—6, Fig. 5; and Fig. 7 is a detail thereof in elevation.

Couch hammocks have heretofore been provided with wind shields. These wind shields have frequently been laced to the suspension ends by gromet eyes and lacing cords, and combined back rests and wind shields have been provided with a spreader connected to wire brackets adapted to take over the spreaders of the suspension ends, as shown in my Patent No. 921,623, dated May 11, 1909.

The form of combined back rest and wind shield selected as embodying my invention is pivotally connected directly to the flexible sheet-like suspension ends and is provided with means whereby it may be permitted to hang vertically, thus serving as a wind shield, or whereby the lower portion thereof may be inclined at varying angles.

Referring more particularly to the drawing, the frame of the hammock is represented as composed of end members 1 and longitudinal or side members 2 detachably or otherwise secured into substantially rectangular form. The frame may be wooden or metallic, or partially wood and partially metal, as desired. Any suitable seating may be employed. For the purpose I have represented a cord seating 3. The hammock body may be of any suitable character. It may be continuous from end to end of the hammock as in the so-called Gloucester type, or the ends may be distinct from each other and be detachably or otherwise connected directly to the framing. I preferably employ flexible sheet-like suspension ends represented at 4, 5 in the various figures. Herein the said ends are detachably connected to the frame by means of hooks 6. Each of the flexible suspension ends is provided at its upper edge with a spreader 7 and with gromet eyes 8, through certain or all of which clue cords or other suspension means 9 may be passed. The couch hammock is preferably provided with a mattress 10, here shown as having side and end valances 11 and 12. The combined back rest and wind shield is preferably composed of a sheet-like member 13, preferably of cloth, and having in its upper edge a pocket 14 receiving a spreader 15. The spreader and cloth member are, in the disclosed embodiment of the invention of the full length of the hammock and the width of the cloth member is preferably such that it may act as a mattress cover, this being evident from the construction shown in Figs. 1 and 5. If desired, the lower edge or other suitable portion of said member 13 may be provided with a pillow extending longitudinally of the hammock and which is so positioned as to be in advance of the hips of the user. I provide means in the disclosed embodiment of the invention for directly and pivotally connecting the upright edges of the combined back rest and wind shield with the sheet-like suspension ends 4 and 5. For this purpose, I have herein represented the spreader 15 as having secured to its ends brackets 16 having hooks 17 which, as shown in Fig. 7, are preferably deflected toward one of the edges of the spreader.

The hooks 17 are adapted to be inserted in any desired gromet eyes 8 of the suspension ends 4, 5, so that the said spreader may be adjusted transversely of the hammock.

In Fig. 1, I have represented gromet eyes pivotally receiving the hooks, but which are not entered by the clue cords. If desired, other gromet eyes may be employed or the hooks may be inserted in any desired gromet eyes also receiving clue cords, the gromet eyes being sufficiently large for this purpose. The construction is such that the hooks are held securely from accidental removal. They can, however, be quickly removed by slight manipulation of the parts. Furthermore the connection between the spreader and the flexible sheet-like suspension ends is a flexible or loose one, so that the combined back rest and wind shield will partake of movements of the suspension ends. Preferably the combined back rest and wind shield is provided at each end and at a suitable distance below its upper edge with gromet eyes 18 adapted to receive lacings 19 by which the device when serving as a wind shield may be held in vertical position. To this end, the lacing may be tightened to the desired extent.

In order to vary the angularity of the device when serving as a back rest, I have herein provided hooks 20 which are pivotally connected at their lower ends 21 to the frame by means of screw eyes 22. The upper end of each hook is bent as indicated at 23 and is adapted to enter any one of a series of pockets 24 formed in or applied to straps 25 preferably attached to the front face of the combined back rest and wind shield near its upright edges. In this manner or in any other suitable way, the lower portion of the device may be positively connected to the frame in any desired angular position.

It will be observed that the means whereby the lower portion of the combined back rest and wind shield is connected to the couch hammock is independent of the pivotal connection of the upper end though coöperating therewith; the upper edge of the combined back rest and wind shield is directly and pivotally connected to the sheet-like suspension ends, whereas the lower portion thereof is directly connected to the frame of the hammock. Preferably the combined back rest and wind shield is provided with a spreader 26 held in position by straps 27 at the rear of said back rest and wind shield. The said spreader 26 serves as a support for the back, and its position may be vertically adjusted in any suitable manner if desired.

The vertical extent of the combined back rest and wind shield is such that when in the position shown in Fig. 5, it serves also as a mattress cover and its lower end directly receives the person. I employ the term "suspension end means" as a generic term including one or both suspension ends, as my invention is, obviously, capable of use transversely or longitudinally of the hammock, by varying the proportions thereof.

From the foregoing description, it will be evident that I have provided a combined back rest and wind shield which may be supported in a vertical position when serving as a wind shield or in any desired angular position when serving as a back rest. Furthermore the device is connected directly to the sheet-like suspension ends at its upper edge in such manner that it cannot readily be accidentally disconnected.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A back rest or wind shield for couch hammocks and like structures, consisting of a member having means for attaching its upper portion to the end-suspension means of the hammock, said member having its upstanding edges provided with strap-pieces, and means adapted to be secured to the seat portion of the hammock and detachably to engage said strap pieces, for securing the back rest or wind shield in position.

2. A back rest or wind shield for couch hammocks and like structures, consisting of a member having means for attaching its upper portion to the end-suspension means of the hammock, said member having its upstanding edges provided with strap pieces, and hooks adapted to be secured to the seat portion of the hammock and detachably to engage said strap pieces.

3. A back rest or wind shield for couch hammocks and like structures, consisting of a member having means for attaching its upper portion to the end-suspension means of the hammock, said member having its upstanding edges provided with strap pieces having a plurality of hook receiving portions, and hooks adapted to be secured to the seat portion of the hammock and interchangeably to engage said hook receiving portions.

4. A back rest or wind shield for couch hammocks and like structures, consisting of a member having means for attaching its upper portion to the end-suspension means of the hammock, said member having its upstanding edges provided with strap pieces each having a plurality of pockets, and hooks adapted to be pivotally secured to the seat portion of the hammock and detachably to engage said pockets.

5. A combined back rest and wind shield for couch hammocks and like structures, consisting of a sheet-like member of substantially the full length of the hammock and having means for pivotally attaching the upper portion to the suspension ends of the hammock, said sheet like member having its upright edges provided with strap pieces, each provided with a plurality of pockets, and hooks adapted to be attached to the seat portion of the hammock and detachably to engage said pockets.

In testimony whereof, I have signed my name to this specification, in the presence of two subscribing witnesses.

ISAAC E. PALMER.

Witnesses:
 THOS. W. HALLORAN,
 CHARLES M. SAUER.